(12) United States Patent
Alperovich et al.

(10) Patent No.: US 6,185,426 B1
(45) Date of Patent: Feb. 6, 2001

(54) SYSTEM, METHOD, AND APPARATUS FOR DELIVERY OF LOCATION INFORMATION ABOUT CALLER

(75) Inventors: Vladimir Alperovich, Dallas; Eric Valentine, Plano, both of TX (US)

(73) Assignee: Ericsson INC, Research Triangle Park, NC (US)

( * ) Notice: Under 35 U.S.C. 154(b), the term of this patent shall be extended for 0 days.

(21) Appl. No.: 08/975,376

(22) Filed: Nov. 20, 1997

(51) Int. Cl.⁷ ....................................................... H04Q 7/20
(52) U.S. Cl. ............................ 455/456; 455/404; 455/415; 379/45
(58) Field of Search ............................ 455/404, 414–415, 455/445, 456–457, 560, 566, 567; 379/127, 142, 93.23, 37, 45

(56) References Cited

U.S. PATENT DOCUMENTS

| | | | |
|---|---|---|---|
| 5,467,381 | * 11/1995 | Peltonen et al. ................. | 455/445 X |
| 5,519,760 | * 5/1996 | Borkowski et al. ................. | 455/404 |
| 5,596,625 | * 1/1997 | LeBlanc ................. | 455/404 |
| 5,727,057 | * 3/1998 | Emery et al. ................. | 379/211 |
| 5,771,283 | * 6/1998 | Chang et al. ................. | 379/142 |
| 5,873,040 | * 2/1999 | Dunn et al. ................. | 455/456 |
| 5,875,401 | * 2/1999 | Rochkind ................. | 455/466 |

FOREIGN PATENT DOCUMENTS

| | | |
|---|---|---|
| 195 20 632 A1 | 6/1995 | (DE) . |
| 0 647 076 A1 | 10/1994 | (EP) . |
| 0 783 235 A2 | 7/1997 | (EP) . |

\* cited by examiner

Primary Examiner—William G. Trost
(74) Attorney, Agent, or Firm—Jenkens & Gilchrist

(57) ABSTRACT

A telecommunications system, and method for providing a called party with the location of the calling party. When a call is received by a switch serving the calling party, the location of the calling party is determined, which is then transmitted to the called party.

23 Claims, 3 Drawing Sheets

SYSTEM, METHOD, AND APPARATUS FOR DELIVERY OF LOCATION INFORMATION ABOUT CALLER

BACKGROUND OF THE PRESENT INVENTION

Field of the Invention

The present invention relates to telecommunications systems and methods for providing caller information, and specifically for a technique for providing information regarding the location of the calling party.

BACKGROUND AND OBJECTS OF THE PRESENT INVENTION

Currently, a party receiving a call can have access to the identity of the party initiating the call as well as the directory number of the party initiating the call. For example, subscriber features such as CallerID™ allow the recipient of a call to view the calling directory number and the identity of the subscriber who was assigned the calling directory number on a visual display.

Despite the advances in caller identification, the called party does not have immediate access as to the caller's location. At present, the location can only be determined by reference to the calling party's directory number. For example, the area code and first three digits of a directory number (in North America) identify the switch serving the calling party. However, the location of a calling party using a mobile phone, such as a cellular or car phone, could not be located because the same calling directory number can originate a call from, possibly, anywhere in the world. Furthermore, having the called party determine the switch serving the calling party would require a database which cross-references the location of all the switches with the directory numbers served. The costs associated with building and maintaining such a database would prove to be impractical for most recipients of a call. Determining the location using the calling directory number would also require the recipient of a call to perform a query of the database. A call recipient with only minimal technical and computer training may not possess the skills to query a database.

Joyce, et. al., "System and Method for Identifying the Location of a Wireless Terminal", EP 0 783 235 A2, have proposed a way to provide a modified area code and telephone exchange number for calls to location-based service centers. One drawback to Joyce's proposal is that the proposal not only fails to provide the identity of the calling party, but, by modifying the area code and telephone exchange number of the calling party, the terminating switch is unable to determine the identity of the calling party under the existing methods. Joyce's proposal also does not disclose or suggest a way for determining the location information from the originating switch, and instead relies on the base station to provide the location information. Thus, another drawback of Joyce's proposal is that modifications are required at each base station.

Accordingly, it is an object of the present invention to provide a way for a call recipient to determine the location of a calling party.

It is also an object of the present invention to minimize, at the called party end, the amount of equipment to receive location information.

SUMMARY OF THE INVENTION

The present invention is directed to a system and method for providing a called party with an approximate location of a calling party by receiving, at an originating switch, a call from the calling party, determining, at the originating switch, the approximate location of the calling party, and transmitting, from the originating switch, the approximate location of the calling party to the called party. The present invention is also directed to a telecommunications system for forwarding the location of a calling party which includes an originating terminal, an originating switch, connected to the originating terminal, for determining the approximate location of the calling party, and a receiving terminal which receives the approximate location of the calling party. The present invention is also directed to a router for forwarding the approximate location of a calling party, which includes a routing database, means for determining the approximate location of the calling party from the routing database, and transmitting means for transmitting the approximate location of the calling party to the called party. The invention is also directed to a method for providing a called party with the approximate location of a calling party by receiving, at an originating switch, a communication from an originating terminal, determining the approximate location of the calling party, concatenating the location of the calling party with the identity of the calling party, and transmitting the location and identity of the calling party to the called party.

BRIEF DESCRIPTION OF THE DRAWINGS

The present invention will be described with reference to the accompanying drawings, which illustrate sample embodiments of the present invention and which are incorporated in the specification hereof by reference, wherein.

DETAILED DESCRIPTION OF PRESENTLY PREFERRED EXEMPLARY EMBODIMENTS

The numerous innovative teachings of the present application will be described with particular reference to the presently preferred exemplary embodiments. However, it should be understood that these embodiments provide only a few examples of the many advantageous uses of the innovative teachings herein. It should be understood that statements made in the specification of the present application do not necessarily delimit any of the various claimed inventions. Moreover, some statements may apply to some inventive features but not to others.

Figure 1:
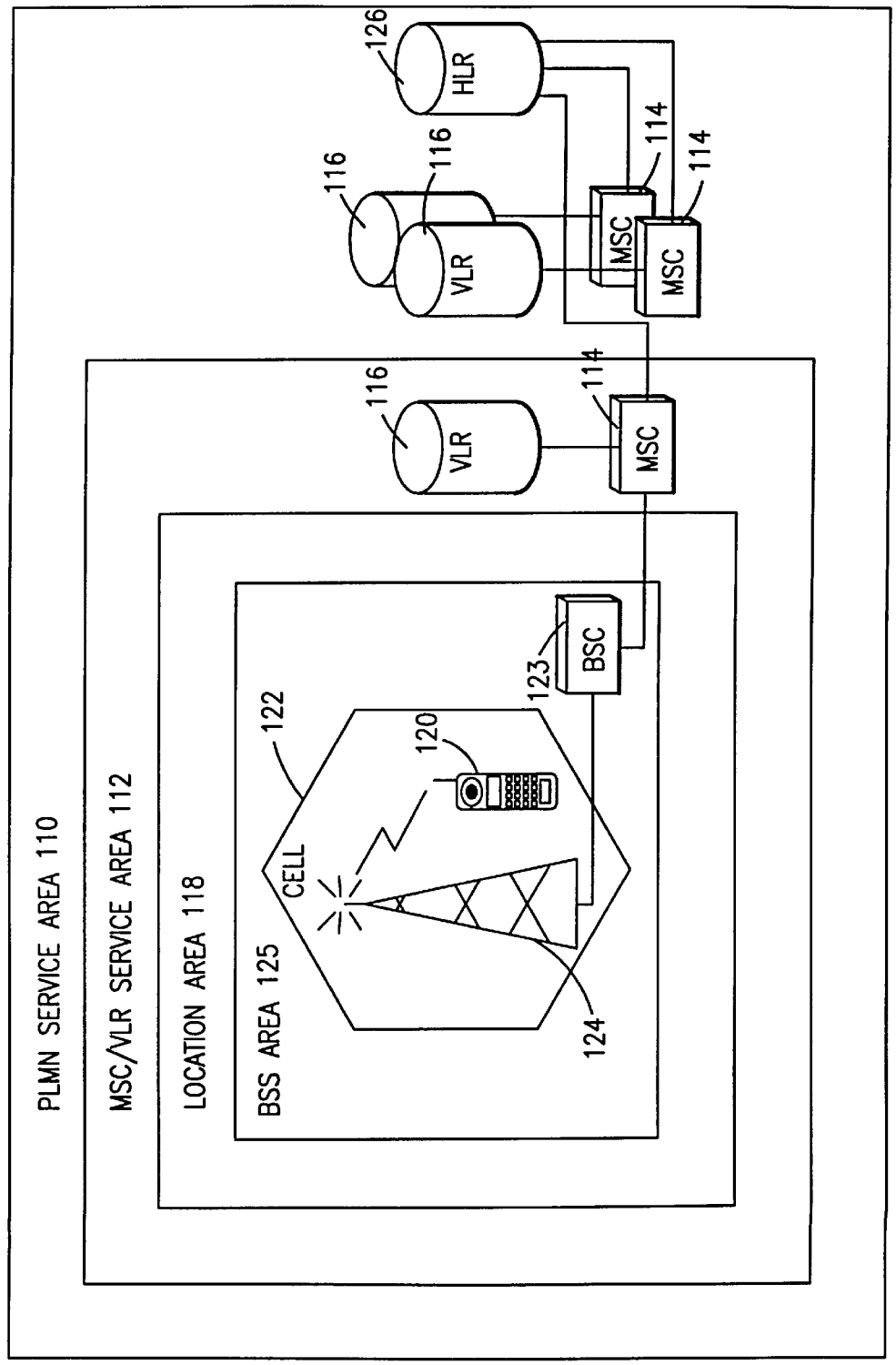
FIG. 1 is an illustration of a Global System for Mobile Communication (GSM) Public Land Mobile Network.

With reference now to FIG. 1 of the drawings, there is illustrated a Global System for Mobile Communication (GSM) Public Land Mobile Network (PLMN), such as cellular network 110, which in turn is composed of a plurality of areas 112, each with a Mobile Services Center (MSC) 114 and an integrated Visitor Location Register (VLR) 116 therein. The MSC/VLR areas 112, in turn, include a plurality of Location Areas (LA) 118, which are defined as that part of a given MSC/VLR area 112 in which a mobile station (MS) (terminal) 120 may move freely without having to send update location information to the MSC/VLR area 112 that controls the LA 118. Each Location Area 112 is divided into a number of cells 122. Mobile Station (MS) 120 is the physical equipment, e.g., a car phone or other portable phone, used by mobile subscribers to communicate with the cellular network 110, each other, and users outside the subscribed network, both wireline and wireless.

The MSC 114 is in communication with at least one Base Station Controller (BSC) 123, which, in turn, is in contact with at least one Base Transceiver Station (BTS) 124. The BTS is the physical equipment, illustrated for simplicity as a radio tower, that provides radio coverage to the geographical part of the cell 122 for which it is responsible. It should be understood that the BSC 123 may be connected to several base transceiver stations 124, and may be implemented as a stand-alone node or integrated with the MSC 114. In either event, the BSC 123 and BTS 124 components, as a whole, are generally referred to as a Base Station System (BSS) the area of which is designated by the reference numeral 125.

With further reference to FIG. 1, the PLMN Service Area or cellular network 110 includes a Home Location Register (HLR) 126, which is a database maintaining all subscriber information, e.g., user profiles, current location information, International Mobile Subscriber Identity (IMSI) numbers, and other administrative information. The HLR 126 may be co-located with a given MSC 114, or alternatively can service multiple MSCs 114, the latter of which is illustrated in FIG. 1.

The VLR 116 is a database containing information about all of the Mobile Stations 120 currently located within the MSC/VLR area 112. If a MS 120 roams into a new MSC/VLR area 112, the VLR 116 connected to that MSC 114 will request data about that Mobile Station 120 from the HLR database 126 (simultaneously informing the HLR 126 about the current location of the MS 120). Accordingly, if the user of the MS 120 then wants to make a call, the local VLR 116 will have the requisite identification information without having to reinterrogate the HLR 126. In the aforesaid manner, the VLR and HLR databases 116 and 126, respectively, contain various subscriber information associated with a given MS 120. When an MS 120 originates a call, the MS 120 transmits a signal to the BSS 125 which transmits a signal to the MSC 114. The signal received by the MSC 114 contains information regarding the directory number and location (such as the particular cell 122 where the MS 120 is located).

Figure 2:
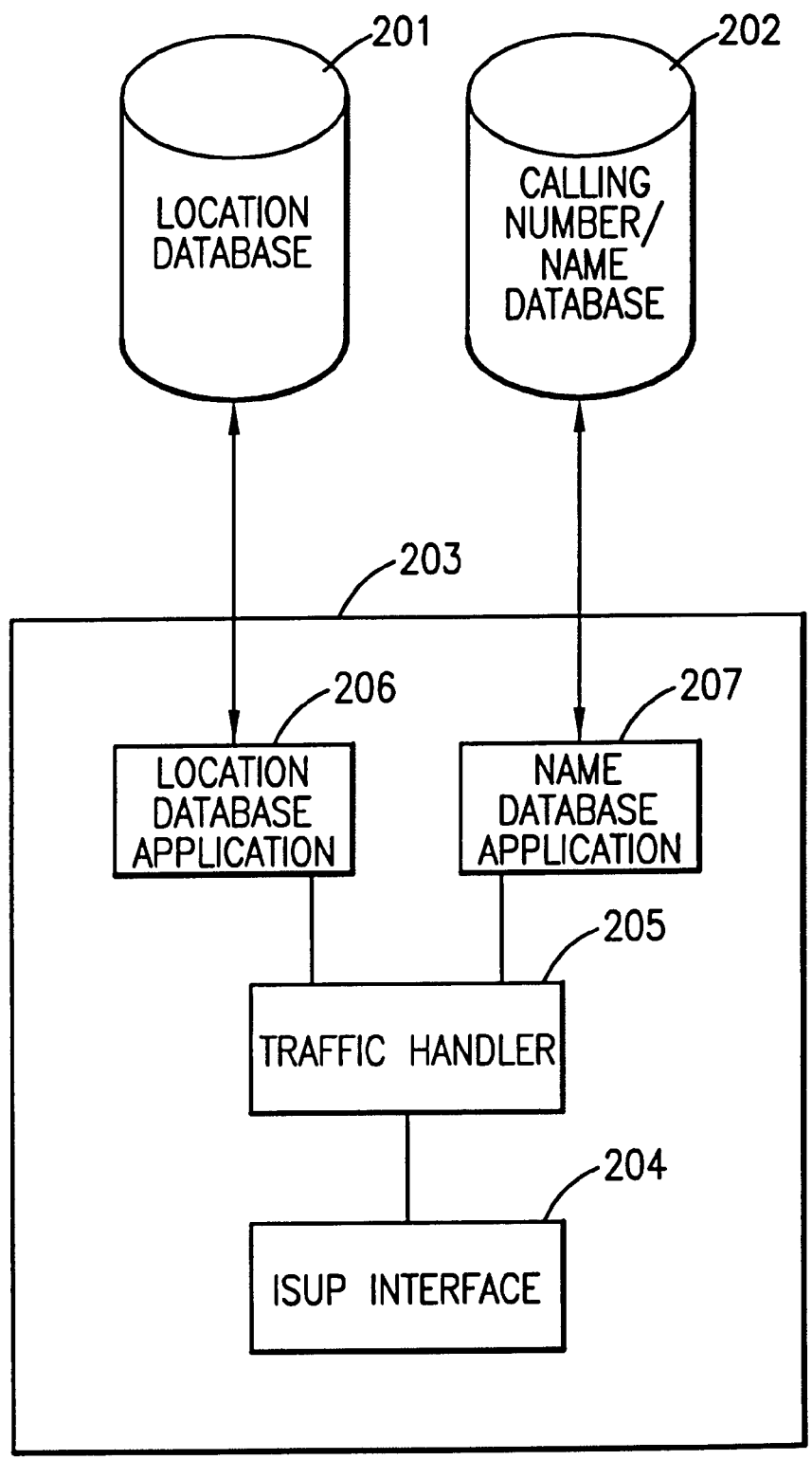
FIG. 2 is an illustration of a Mobile Services Center (MSC) in accordance with the present invention.

Referring now to FIG. 2, an MSC, such as 114 in FIG. 1, is shown in accordance with a preferred embodiment of the present invention and designated by the reference numeral 203. The MSC 203 includes an Integrated Services Digital Network (ISDN) User Part (ISUP) interface 204, a traffic handler 205, a location database application 206, and a name database application 207.

When the MSC 203 receives a signal via the ISUP interface 204, from within a BSS (such as 125 in FIG. 1) regarding a call from an MS (such as 120, in FIG. 1), the traffic handler 205 sends the information pertaining to location to the location database application 206, and sends information pertaining to the directory number to the name database application 207.

The name database application 207 sends inputs and receives outputs from a Calling Number/Name Database (CN/ND) 202. The CN/ND 202 is a database which cross-references directory numbers of MSs (such as 120, in FIG. 1) with the name of the subscriber who is assigned that directory number. When the name database application 207 inputs a directory number to the CN/ND 202, the CN/ND outputs the name of the subscriber, who is assigned the directory number, to the name database application 207.

Similarly the location database application 206 inputs and receives outputs from a Location Database 201. The Location Database 201 cross-references the location information in the format it is received in by the MSC 203, with approximate geographical landmarks. For example, the location information might contain a number associated with the particular cell (such as 122, in FIG. 1) in which an MS (such as 120, in FIG. 1) is located. Alternatively, the location information might contain the coordinates (such as latitude and longitude) of the location of an MS (such as 120, in FIG. 1). The cross-referenced approximate geographical landmarks can be, for example, the municipality or district where the particular cell (such as 122, in FIG. 1), or coordinates are located. When the location database application 206 inputs location information to the Location Database 201, the Location Database 201 will output the approximate geographical landmark associated with the location information to the location database application 206.

Although the Location Database 201 is shown connected to only one location database application 206 within the MSC 203, it should be recognized that the Location Database 201 can be connected to a number of location database applications 206 for many MSCs 203. Likewise, although the CN/ND 202 is shown connected to one name database application 207 of one MSC 203, it should be understood that the CN/ND 202 can be connected to a number of name database applications 207 for many MSCs 203.

It should also be recognized that the Location Database 201 can be consolidated with the location database application 206 within the MSC 203. Likewise, the CN/ND 202 can be consolidated with the name database application 207 within the MSC 203. It should also be noted that an approximate geographical landmark can also be derived at the BSS 125 level by sending, for example, a signal which identifies the location of the particular BS 124 receiving the call, or a signal which identifies the location of the MS 120 within the particular cell 122 from which the call is originating from, to the MSC 114.

The ISUP Interface 204 prepares a packet of information pertaining to the call according to a communications protocol known by those skilled in the art as ISUP. In a preferred embodiment, the approximate geographical landmark and subscriber name are concatenated and then inserted into a Calling Name field of an ISUP packet known by those skilled in the art as an Initial Address Message (IAM).

Although the embodiment of the invention shown in FIG. 2 utilizes an MSC 203, it should also be understood that the present invention is not limited to use in an MSC. Instead, a switch serving subscribers in a wireline system, such as what is known in the art as a Service Switching Point (SSP), can be utilized. The location database application 206 can be modified to input the directory number to the Location Database 201. The Location Database 201 can be modified to cross-reference directory numbers with approximate geographical landmarks such as, for example, the address of the subscriber who is assigned the directory number. The Location Database 201 can then output the address of the subscriber to the location database application 206 for insertion into the ISUP packet built by the ISUP Interface 204.

Figure 3:
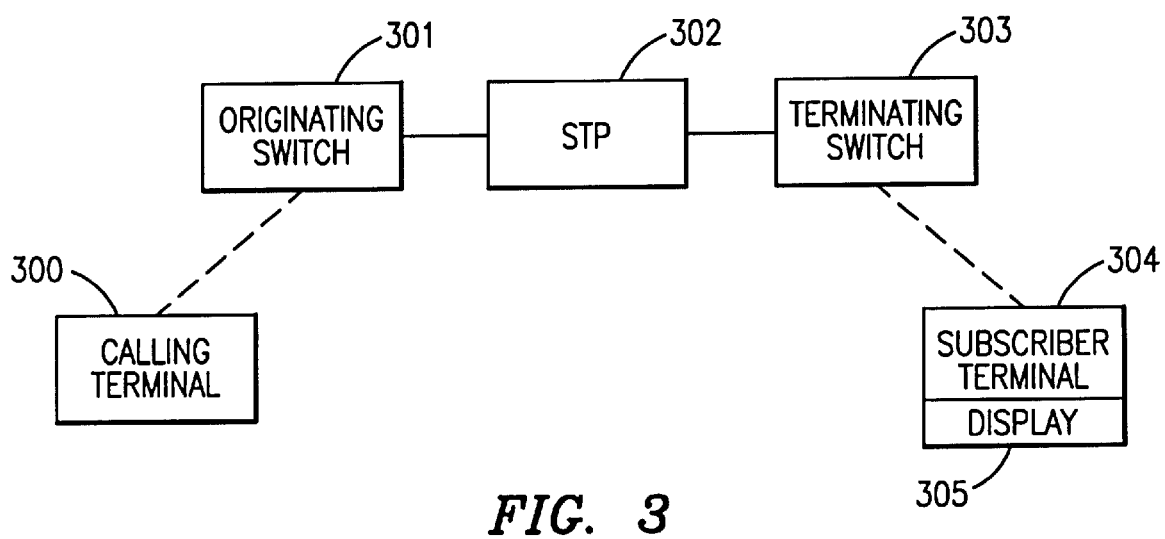
FIG. 3 illustrates a communication between a calling party and a called party using a signaling network.

Referring now to FIG. 3, a terminating switch 303 receiving an ISUP protocol message originating from an originating switch 301 is illustrated. The originating switch 301 and the terminating switch 303 service a number of subscriber terminals including those designated as 300 and 304 respectively. Subscriber terminal 300 can be, but is not limited to, a telephone, cellular phone, computer, or FAX machine (not shown).

The originating switch 301 routes information regarding calls made from the calling terminal 300 (and other such terminals). The information regarding the call is formatted into an ISUP packet and sent to what is known in the art as a Signal Transfer Point (STP) 302. The originating switch can be, but is not limited to, an MSC (such as 203 in FIG. 2), or a Service Switching Point or SSP (not shown).

Although the STP 302 in FIG. 3 is shown connected to both the originating switch 301 and the terminating switch 303, it should be understood that the STP 302 may be connected to multiple other switches as well. An ISUP packet message from a first subscriber at terminal 300 to a second subscriber at terminal 304 is sent to the STP 302 for routing to the particular switch 303 servicing the subscriber terminal 304 where the call terminates.

As discussed, the STP 302 routes the ISUP packet to the terminating switch 303. The terminating switch 303 retrieves the calling name field which includes the approximate geographical landmark and the identity of the calling subscriber. The subscriber terminal 304 can then communicate this information to the subscriber by, for example, displaying the information on a visual display 305.

Although the invention has been described with a certain degree of particularity, it should be recognized that elements thereof may be altered by persons skilled in the art without departing from the spirit and scope of the invention. For example, it should be noted that the aforedescribed delivery of location information about the caller can be implemented in any telecommunication system, and should not be limited to GSM systems. Therefore, the invention is limited only by the following claims and their equivalents.

What is claimed is:

1. In a telecommunications system having a first terminal associated with a first end office and a second terminal associated with a second end office, a method for providing a subscriber at said second terminal with an approximate geographical landmark associated with said first terminal, said method comprising the steps of:

receiving a communication from said first terminal;

determining, at said first end office, said approximate geographical landmark associated with said first terminal;

concatenating said approximate geographical landmark with an identification associated with said first terminal;

inserting said concatenated identification and approximate geographical landmark into a calling name field; and transmitting, by said first end office, said calling name field to said second terminal.

2. The method of claim 1, wherein said determining step further comprises accessing, at said first switch, a geographical database, said geographical database comprising a plurality of said approximate geographical landmarks.

3. The method of claim 1, wherein said transmitting step comprises the steps of:

inserting said approximate geographical landmark in an informational packet; and transmitting said informational packet to said second switch.

4. The method of claim 3, wherein said informational packet comprises an Initial Address Message.

5. The method of claim 1, wherein said approximate geographical landmark comprises a political subdivision.

6. The method according to claim 1, wherein said communication is wireless, said wireless communication being independent of location information.

7. The method according to claim 1, wherein said communication is wireless, said wireless communication occurring at a base station associated with said first terminal.

8. The method according to claim 1, wherein said determining further includes cross-referencing said approximate geographical landmark with said location of said first terminal within a geographical database.

9. A telecommunications system for transmitting an approximate geographical landmark to a called party, said telecommunications system comprising:

a first terminal having an approximate geographical landmark associated therewith;

a first end office, associated with said first terminal, said first end office determining said approximate geographical landmark associated with said first terminal;

packet building means for building an informational packet;

a concatenator for concatenating said approximate geographical landmark with an identification, said identification being associated with said first terminal, said concatenated geographical landmark and said identification being included in a calling name field; and a second terminal, said approximate geographical landmark being forwarded by said first end office to said second terminal.

10. The system of claim 9, further comprising:

a database operably coupled with said first switch, said database comprising a plurality of approximate geographical landmarks; and wherein said first switch further comprises an input/output port for accessing said database.

11. The system of claim 9 wherein said first switch further comprises:

said packet building means for inserting said approximate geographical landmark into said informational packet; and a transmitter for transmitting said informational packet to said second switch.

12. The system of claim 11 wherein said packet comprises an Initial Address Message.

13. The system of claim 9, wherein said approximate geographical landmark comprises a political subdivision.

14. The telecommunications system according to claim 9, further comprising:

a base station, associated with said first terminal, for receiving a wireless communication independent of location information from said first terminal.

15. The telecommunications system according to claim 9, wherein said first end office determines said approximate geographical landmark associated with said first terminal by cross-referencing said approximate geographical landmark with said location of said terminal within a geographical database.

16. A telecommunications system for notifying a called party of an approximate geographical landmark of a calling party, said telecommunications system comprising:

a base station, identifying a location of said calling party, for receiving a communication of said calling party;

a first end office associated with said calling party, said first end office receiving said location of said calling party;

a geographical database connected to said first end office, said geographical database having approximate geographical landmark information associated with said location of said calling party, wherein said geographical database receives said location of said calling party and cross-references said approximate geographical landmark information;

racket building means for building an informational packet;

a concatenator for concatenating said approximate geographical landmark with an identification, said identification being associated with said first terminal, said concatenated geographical landmark and said identification being included in a calling name field; and a transmission means for transmitting said approximate geographical landmark information to said called party.

17. The telecommunications system of claim 16, further comprising:

a database for storing said location of said calling party; and a second end office for receiving said approximate geographical landmark information transmitted to said called party.

18. The telecommunications system of claim 16, wherein said approximate geographical landmark information includes political subdivision information.

19. The telecommunications system of claim 16, wherein said location information includes a cell where said calling party is presently located.

20. A method within a telecommunications system for notifying a called party of an approximate geographical landmark of a calling party, said method comprising the steps of:

receiving a communication from said calling party at a base station, said base station identifying a location of said calling party;

receiving, at an end office associated with said calling party, said location of said calling party;

receiving said location of said calling party at a geographical database having approximate geographical landmark information associated with said location of said calling party;

cross-referencing said approximate geographical landmark information based upon said location of said calling party within said geographical database; and concatenating said appropriate geographical landmark with an identification associated with said first terminal;

inserting said concatenated identification and approximate geographical landmark into a calling name field;

transmitting said approximate geographical landmark information to said called party.

21. The method according to claim 20, further comprising the step of:

transmitting said location of said calling party stored in a database to said end office associated with said calling party; and transmitting said approximate geographical landmark information to an end office associated with said called party.

22. The method according to claim 20, wherein said approximate geographical landmark information includes political subdivision information.

23. The method according to claim 20, wherein said location of said calling party includes a cell where said calling party is presently located.

* * * * *

UNITED STATES PATENT AND TRADEMARK OFFICE
CERTIFICATE OF CORRECTION

PATENT NO.   : 6,185,426 B1
DATED        : February 6, 2001
INVENTOR(S)  : Alperovich et al.

It is certified that error appears in the above-identified patent and that said Letters Patent is hereby corrected as shown below:

<u>Column 7,</u>
Line 4, replace "racket" with -- packet --

Signed and Sealed this

First Day of January, 2002

Attest:

Attesting Officer

JAMES E. ROGAN
Director of the United States Patent and Trademark Office